United States Patent
Chang

(10) Patent No.: US 6,531,789 B1
(45) Date of Patent: Mar. 11, 2003

(54) ELECTRIC ENERGY SOURCE HAVING SAFETY CONTROL DEVICE

(75) Inventor: I Chang Chang, Chong Ho (TW)

(73) Assignee: Iwei Technology Co., Ltd., Taipei (TW)

(*) Notice: Subject to any disclaimer, the term of this patent is extended or adjusted under 35 U.S.C. 154(b) by 0 days.

(21) Appl. No.: 09/935,544

(22) Filed: Aug. 24, 2001

(51) Int. Cl.⁷ .................................................. H02J 7/00
(52) U.S. Cl. ...................... 307/10.7; 307/150; 307/326
(58) Field of Search ............................... 320/104, 105; 307/10.7, 150, 326–328

(56) References Cited

U.S. PATENT DOCUMENTS

| | | | | |
|---|---|---|---|---|
| 4,217,534 A | * | 8/1980 | Cole | 320/105 |
| 4,871,957 A | * | 10/1989 | Taranto et al. | 320/105 |
| 5,103,155 A | * | 4/1992 | Joannou | 320/105 |
| 5,319,298 A | * | 6/1994 | Wanzong et al. | 320/158 |
| 6,057,667 A | * | 5/2000 | Mills | 320/105 |
| 6,212,054 B1 | * | 4/2001 | Chan | 307/10.7 |

* cited by examiner

*Primary Examiner*—Fritz Fleming

(57) ABSTRACT

An electric energy source includes a battery, a positive and a negative booster clamps coupled to the battery for coupling the battery to the vehicle battery, and a device for selectively coupling the battery to the positive and the negative booster clamps when the positive and the negative booster clamps are correctly coupled to the vehicle battery. The battery may supply the energy to the booster clamps when the booster clamps are correctly coupled to the vehicle battery, and will not supply the energy when the clamps are wrongly coupled to the vehicle battery.

5 Claims, 3 Drawing Sheets

ELECTRIC ENERGY SOURCE HAVING SAFETY CONTROL DEVICE

BACKGROUND OF THE INVENTION

1. Field of the Invention

The present invention relates to an electric energy source, and more particularly to an electric energy source having a safety control device.

2. Description of the Prior Art

As shown in FIG. 3, a typical electric energy source comprises a battery 1, and a positive and a negative booster clamps 3, 4 coupled to or extended from the battery 1, for coupling to the terminals 21 of the vehicle battery 2, which may be coupled to the starter 6 of the vehicle for starting the engine of the vehicle. However, great sparks may be generated when the positive and the negative booster clamps 3, 4 are coupling to the terminals 21 of the vehicle battery 2, and/or when the positive and the negative booster clamps 3, 4 are contacted with each other inadvertently, and/or when the positive and the negative booster clamps 3, 4 are simultaneously contacted with the other conductive materials or members or facilities inadvertently. People may be hurt by the inadvertently contacted positive and negative booster clamps 3, 4. In addition, the electric facilities of the vehicle may also be damaged by the inadvertently contacted positive and negative booster clamps 3, 4. Particularly, when the positive and the negative booster clamps 3, 4 are wrongly coupled to the terminals 21 of the vehicle battery 2, a great spark and even a great disaster may be occurred.

The present invention has arisen to mitigate and/or obviate the afore-described disadvantages of the conventional electric energy sources for jumper purposes.

SUMMARY OF THE INVENTION

The primary objective of the present invention is to provide an electric energy source including a safety control device for supplying the electric energy to the terminals of the vehicle battery only when the positive and the negative booster clamps are correctly coupled to the terminals of the vehicle battery.

The other objective of the present invention is to provide an electric energy source including a safety control device for generating a warning signal when the positive and the negative booster clamps are wrongly coupled to the terminals of the vehicle battery.

In accordance with one aspect of the invention, there is provided an electric energy source for coupling to and for supplying an electric energy to a vehicle battery comprising a first battery, a positive and a negative booster clamps coupled to the first battery for coupling the first battery to the vehicle battery, and means for selectively coupling the first battery to the positive and the negative booster clamps when the positive and the negative booster clamps are correctly coupled to the vehicle battery. The first battery may supply the electric energy to the positive and the negative booster clamps only when the positive and the negative booster clamps are correctly coupled to the vehicle battery. On the contrary, the first battery will not supply the electric energy to the positive and the negative booster clamps when the positive and the negative booster clamps are wrongly coupled to the vehicle battery.

The selectively coupling means includes a primary switch coupled between the first battery and the positive booster clamp for switching off an electric circuit between the first battery and the positive booster clamp before the positive and the negative booster clamps are correctly coupled to the vehicle battery.

The selectively coupling means includes a first relay coupled between the first battery and the positive booster clamp for switching off an electric circuit between the first battery and the positive booster clamp before the positive and the negative booster clamps are correctly coupled to the vehicle battery.

A second relay is further provided and coupled between the first relay and the positive booster clamp for being actuated by the first relay to supply an electric energy to the positive booster clamp.

A device, such as a light device, or a light emitting diode, is further provided and coupled to the first relay for indicating that the first relay has been actuated and is energized.

A device is further provided for detecting whether the positive and the negative booster clamps have been correctly coupled to the vehicle battery or not and includes a positive voltage detecting circuit having a transistor coupled to the first relay for actuating the first relay when the positive and the negative booster clamps have been detected to be correctly coupled to the vehicle battery.

The detecting device includes a negative voltage detecting circuit having an amplifier coupled to the transistor of the positive voltage detecting circuit and having a comparator coupled to the amplifier.

The transistor includes a collector coupled to the first relay, and includes a base coupled to the amplifier of the negative voltage detecting circuit. The amplifier includes an opposite phase input coupled to the transistor.

A device is further provided for generating a warning signal when the positive and the negative booster clamps have been detected to be wrongly coupled to the vehicle battery and includes a buzzer coupled to the comparator for being actuated by the comparator and for generating a sound warning signal. The warning signal generating device may also include a light device for generating a light warning signal.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
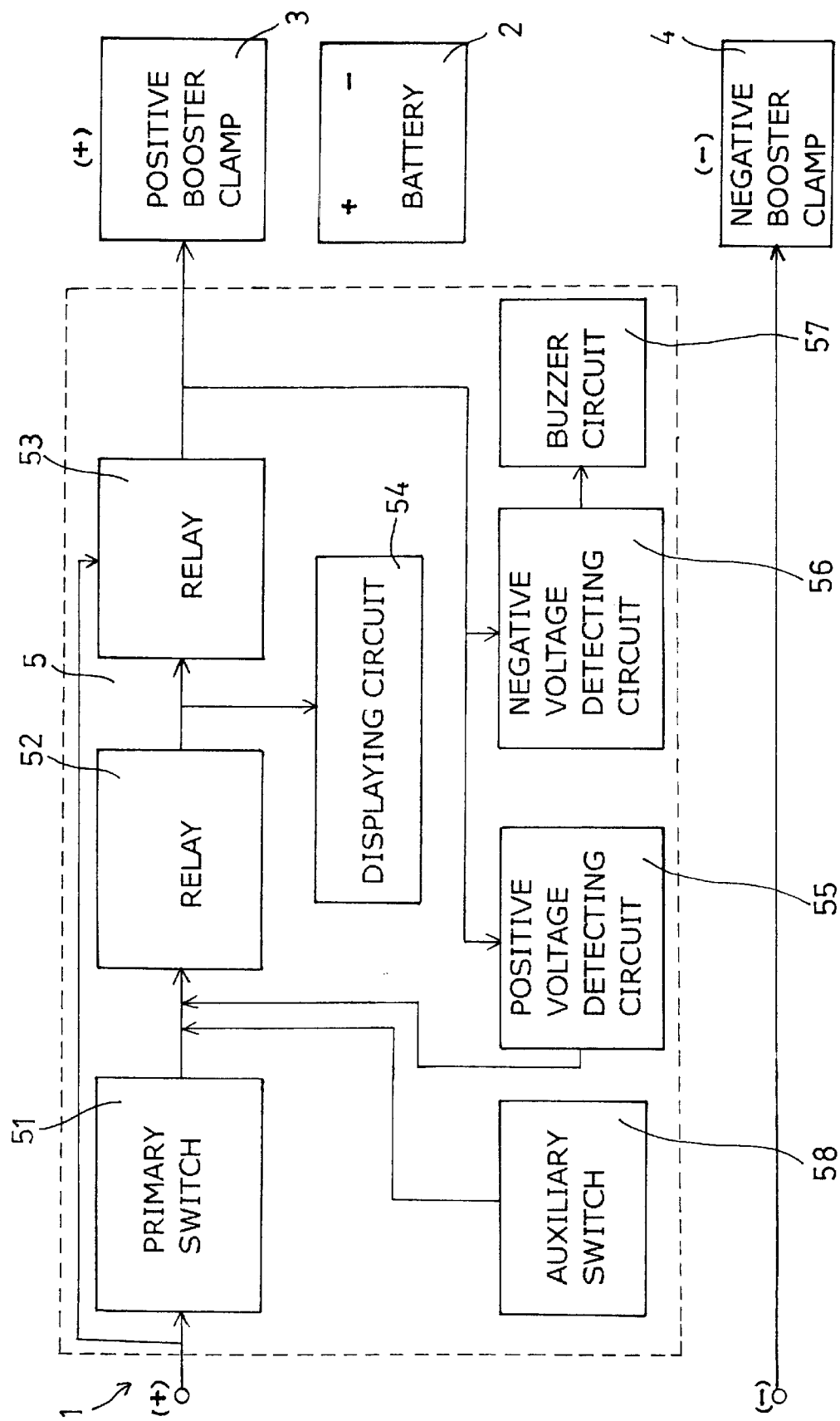
FIG. 1 is a block diagram of an electric energy source in accordance with the present invention.
Figure 2:
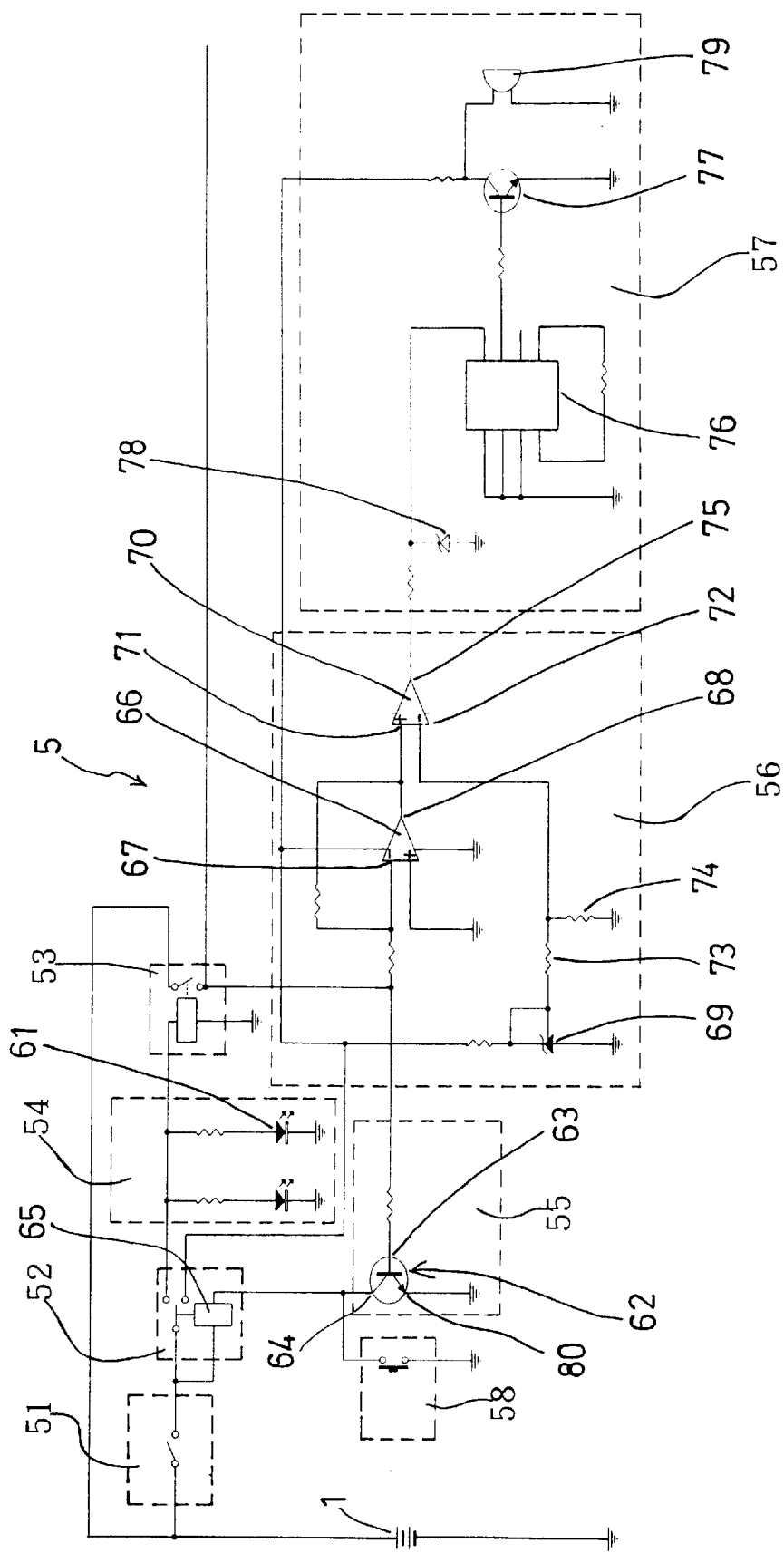
FIG. 2 is an electric circuit of the electric energy source.
Figure 3:
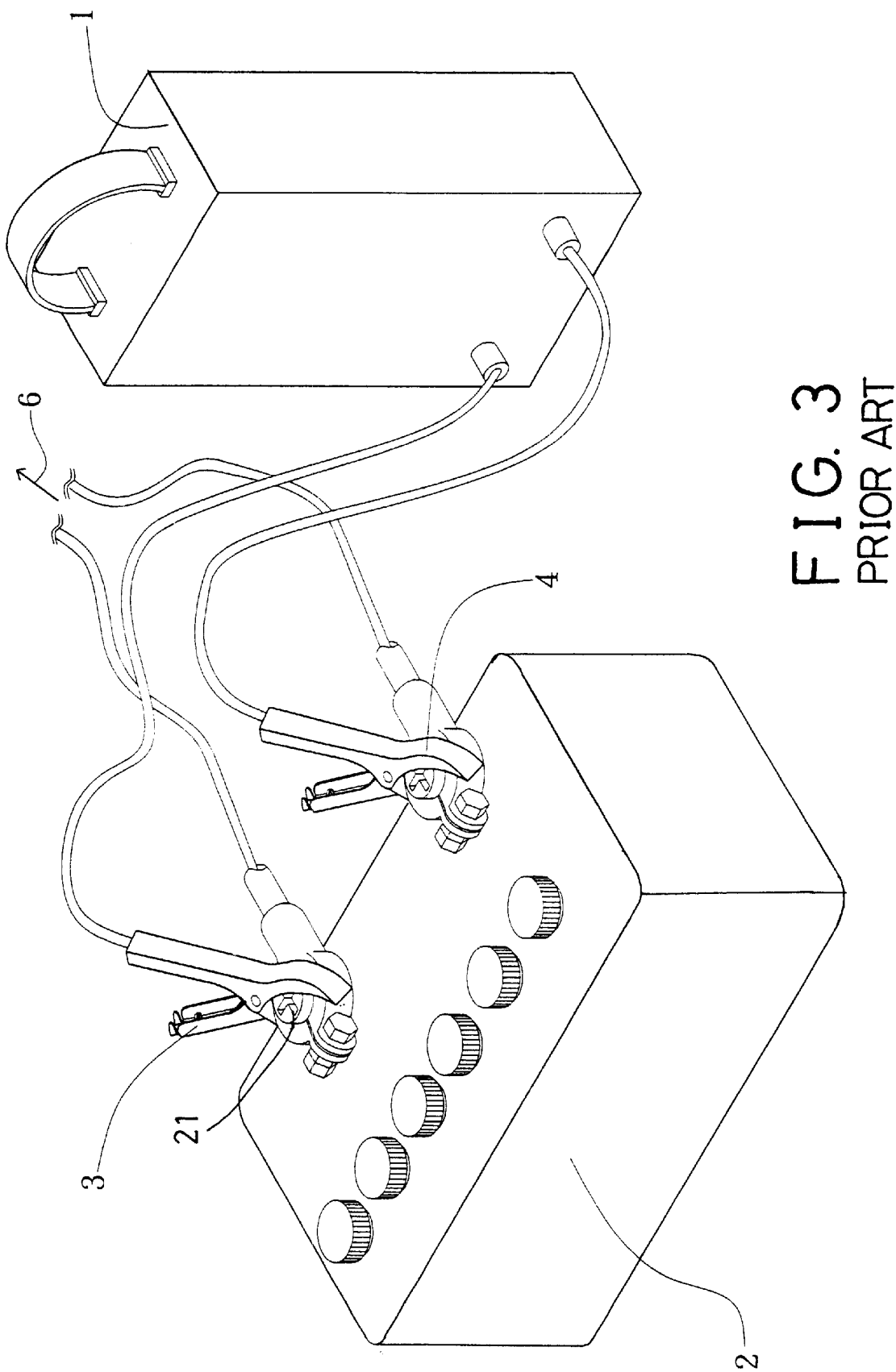
FIG. 3 is a perspective view illustrating the typical electric energy source for jumper purposes.

Referring to FIGS. 1 and 2, an electric energy source in accordance with the present invention comprises a battery 1, a control device 5, and a positive and a negative booster clamps 3, 4 coupled to the battery 1 and the control device 5 respectively, for coupling to the terminals of the vehicle battery and thus for coupling to the starter 6 of the vehicle in order to start the engine of the vehicle.

The control device 5 includes a primary switch 51 coupled to such as the positive terminal of the battery 1, and coupled to a first relay 52 which is then coupled to a second relay 53. The second relay 53 is coupled to the positive booster clamp 3. A displaying circuit 54 includes one or more light devices 61, such as the liquid crystal displayers, or the light emitting diodes (LED) 61 coupled between the relays 52, 53 for indicating that the first relay 52 has been actuated or has been energized.

The control device 5 further includes a positive voltage detecting circuit 55 having a transistor 62 which includes a base 63 for coupling to the positive booster clamp 3 and which includes a collector 64 for coupling to the first relay 52, such as to the exciting coils or the exciting windings 65 of the first relay 52. The transistor 62 of the positive detecting circuit 55 includes an emitter 80 coupled to the negative booster clamp 4. A negative voltage detecting circuit 56 includes an amplifier 66 having an opposite phase input 67 coupled to the collector 63 of the transistor 62, and coupled to the positive booster clamp 3, and having an output 68 coupled to a non-opposite phase input 71 of a comparator 70.

A stable circuit or a diode 69 is coupled in series to the opposite phase input 72 of the comparator 70 via a resistor 73, and another resistor 74 is coupled to, in parallel, and between the resistor 73 and the opposite phase input 72 of the comparator 70, for providing a reference voltage to the opposite phase input 72 of the comparator 70. The comparator 70 includes an output 75 coupled to a buzzer circuit 57, such as coupled to a buzzer audio signal generating circuit 76 and a signal amplifier 77 via a diode 78, in order to actuate a buzzer 79 or the other warning signal generating device 79, such as a LED, or the like.

In operation, when the primary switch 51 is actuated or is switched on, and before the relay 52 is actuated or energized, the electric circuit between the battery 1 and the positive and the negative booster clamps 3, 4, particularly the electric circuit between the positive terminal of the battery 1 and the positive booster clamps 3 is cut off, such that no electricity will be supplied to the positive and the negative. booster clamps 3, 4 at this moment. No sparks will be generated at this moment, when the positive and the negative booster clamps 3, 4 are coupling to the terminals of the vehicle battery 2, and/or when the positive and the negative booster clamps 3, 4 are contacted with each other inadvertently, and/or when the positive and the negative booster clamps 3, 4 are simultaneously contacted with the other conductive materials or members or facilities inadvertently.

When the positive and the negative booster clamps 3, 4 have been coupled to the terminals of the vehicle battery 2, the remaining electricity in the vehicle battery 2 may supply the electricity energy to energize the positive and the negative voltage detecting circuits 55, 56 of the control device 5, for detecting and testing whether the positive and the negative booster clamps 3, 4 have been correctly or wrongly coupled to the terminals of the vehicle battery 2 respectively. The transistor 62 of the positive voltage detecting circuit 55 of the control device 5 may be energized and actuated with a voltage as low as 0.7 volt.

When the positive and the negative booster clamps 3, 4 have been detected to be correctly coupled to the terminals of the vehicle battery 2 respectively, the transistor 62 of the positive voltage detecting circuit 55 may supply a positive voltage to the opposite phase input 67 of the amplifier 66, and the amplifier 66 may then send out a negative voltage to the comparator 70. The reference voltage from the diode 69 has an absolute value less than that of the negative voltage sent out from the amplifier 66 such that the buzzer circuit 57 will not be actuated and the buzzer 79 will not be energized at this moment.

At this moment, the collector 64 of the transistor 62 of the positive voltage detecting circuit 55 that is coupled to the relay 52 may actuate the relay 52. The electric energy from the battery 1 may then be supplied through the primary switch 51 and the relay 52 to actuate or to energize the second relay 53, and to supply the electricity energy to the positive and the negative booster clamps 3, 4. Accordingly, the positive and the negative booster clamps 3, 4 may be supplied the electric energy to the terminals of the vehicle battery 2 only after the positive and the negative booster clamps 3, 4 have been correctly coupled to the terminals of the vehicle battery 2.

On the contrary, when the positive and the negative booster clamps 3, 4 have been detected to be wrongly coupled to the terminals of the vehicle battery 2 respectively, the negative electricity or the negative voltage of the negative terminal of the vehicle battery 2 may be coupled to and may supply the negative voltage to the positive booster clamp 3. At this moment, the transistor 62 of the positive voltage detecting circuit 55 will not be energized because the negative voltage will be lower than 0.7 volt. The amplifier 66 may convert the negative voltage into a positive voltage which is then supplied to the non-opposite phase input 71 of the comparator 70. The comparator 70 may then supply a positive voltage to energize and to actuate the signal amplifier 77 and to energize the buzzer 79 or the other warning signal generating device 79, which may generate a warning sound or light signal to warn the users that the positive and the negative booster clamps 3, 4 have been wrongly coupled to the terminals of the vehicle battery 2 respectively. The users may then change and correctly couple the positive and the negative booster clamps 3, 4 to the terminals of the vehicle battery 2 respectively.

At this moment, the transistor 62 of the positive voltage detecting circuit 55 and thus the relay 52 will not be actuated or energized, The electric energy from the battery 1 thus will not be supplied to the positive and the negative booster clamps 3, 4. After the positive and the negative booster clamps 3, 4 have been changed and correctly coupled to the terminals of the vehicle battery 2 respectively, the transistor 62 of the positive voltage detecting circuit 55 may be energized again to electrically couple the terminals of the battery 1 to the positive and the negative booster clamps 3, 4 which may then supply the electric energy to the terminals of the vehicle battery 2.

Accordingly, the terminals of the battery 1 will not be electrically coupled to the positive and the negative booster clamps 3, 4 when the positive and the negative booster clamps 3, 4 are wrongly coupled to the terminals of the vehicle battery 2 respectively, or before the positive and the negative booster clamps 3, 4 have been correctly coupled to the terminals of the vehicle battery 2 respectively.

As shown in FIG. 2, an auxiliary switch 58 may further be provided and coupled to or between the positive voltage detecting circuit 55 and the first relay 52 for compulsorily forcing or actuating said first relay 52 to energize or to actuate said second relay 53 when the vehicle battery 2 has no any electricity energy.

Accordingly, the electric energy source in accordance with the present invention includes a safety control device for supplying the electric energy to the terminals of the vehicle battery only when the positive and the negative booster clamps are correctly coupled to the terminals of the vehicle battery, and for generating a warning signal when the positive and the negative booster clamps are wrongly coupled to the terminals of the vehicle battery.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric energy source for coupling to and for supplying an electric energy to a vehicle battery, said electric energy source comprising:
   a) first battery,
   b) a positive and a negative booster clamps coupled to said first battery for coupling said first battery to the vehicle battery,
   c) a first relay coupled to said first battery for switching off an electric circuit to said first battery before said positive and said negative booster clamps are correctly coupled to the vehicle battery,
   d) a second relay coupled between said first relay and said positive booster clamp for being actuated by said first relay to supply an electric energy to said positive booster clasp,
   e) a positive voltage detecting circuit including a transistor coupled to said first relay for actuating said first relay when said positive and said negative booster clamps have been detected to be correctly coupled to the vehicle battery,
   f) a negative voltage detecting circuit includinging an amplifier coupled to said transistor of said positive voltage detecting circuit, and
   g) means for generating a warning signal when said positive and said negative booster clamps have been detected to be wrongly coupled to the vehicle battery.

2. The electric energy source according to claim 1, wherein said selectively coupling means includes a primary switch coupled between said first battery and said positive booster clamp for switching off an electric circuit between said first battery and said positive booster clamp before said positive and said negative booster clamps are correctly coupled to the vehicle battery.

3. The electric energy source according to claim 1 further comprising means for indicating an actuation of said first relay.

4. The electric energy source according to claim 1, wherein said transistor includes a collector coupled to said first relay, and includes a base coupled to said amplifier of said negative voltage detecting circuit.

5. The electric energy source according to claim 1, wherein said amplifier includes an opposite phase input coupled to said transistor.

* * * * *